United States Patent
Swedin (10) Patent No.: US 7,705,834 B2
(45) Date of Patent: Apr. 27, 2010

(54) TOUCH SENSITIVE DISPLAY DEVICE

(75) Inventor: Anders Swedin, Helsingborg (SE)

(73) Assignee: Intergritouch Development AB, Helsingborg (SE)

( * ) Notice: Subject to any disclaimer, the term of this patent is extended or adjusted under 35 U.S.C. 154(b) by 781 days.

(21) Appl. No.: 10/575,622

(22) PCT Filed: Oct. 12, 2004

(86) PCT No.: PCT/SE2004/001447

§ 371 (c)(1),
(2), (4) Date: Nov. 6, 2006

(87) PCT Pub. No.: WO2005/036510

PCT Pub. Date: Apr. 21, 2005

(65) Prior Publication Data

US 2007/0046639 A1    Mar. 1, 2007

Related U.S. Application Data (60) Provisional application No. 60/516,314, filed on Nov. 3, 2003.

(30) Foreign Application Priority Data

Oct. 13, 2003  (SE) .................................... 0302711

(51) Int. Cl.
*G06F 3/045* (2006.01)
(52) U.S. Cl. .................... 345/174; 345/173; 178/18.05; 178/18.06
(58) Field of Classification Search ................ 345/104, 345/173, 174, 176, 178; 178/18.01–18.11; 349/142
See application file for complete search history.

(56) References Cited

U.S. PATENT DOCUMENTS

| | | | | |
|---|---|---|---|---|
| 4,136,291 A | * | 1/1979 | Waldron | 327/77 |
| 4,224,615 A | | 9/1980 | Penz | |
| 4,893,115 A | * | 1/1990 | Blanchard | 345/174 |
| 4,910,504 A | | 3/1990 | Eriksson | |

(Continued)

FOREIGN PATENT DOCUMENTS

DE    19802479    7/1999

(Continued)

OTHER PUBLICATIONS

An International Search Report mailed Jan. 14, 2005, in International Application PCT/SE2004/001447.

*Primary Examiner*—Amare Mengistu
*Assistant Examiner*—Dmitriy Bolotin
(74) *Attorney, Agent, or Firm*—Finnegan, Henderson, Farabow, Garrett & Dunner, LLP (57) ABSTRACT

A touch sensor is disclosed comprising a display device having a substrate on which substrate at least one display electrode is disposed for the display of a shape on the display device. An interface is coupled to the at least one display electrode for receiving display data to the display device. Moreover is a measuring circuit coupled to the at least one display electrode. Switching means are provided for connecting the interface to the at least one display electrode when the switching means is in a first state of operation and connecting the measuring circuit to the at least one display electrode when the switching means is in a second state of operation.

15 Claims, 3 Drawing Sheets

U.S. PATENT DOCUMENTS

| | | | |
|---|---|---|---|
| 5,043,710 A | 8/1991 | Rydel | |
| 7,388,571 B2 * | 6/2008 | Lowles et al. | 345/104 |
| 2001/0020578 A1 | 9/2001 | Baier | |
| 2003/0137495 A1 | 7/2003 | Canova, Jr. | |
| 2005/0270273 A1 * | 12/2005 | Marten | 345/173 |

FOREIGN PATENT DOCUMENTS

| | | |
|---|---|---|
| EP | 1 133 057 A2 | 9/2001 |
| GB | 1553563 | 10/1979 |

* cited by examiner

TOUCH SENSITIVE DISPLAY DEVICE

This application is a United States National Phase Entry of International Application No. PCT/SE2004/001447, filed Oct. 12, 2004, which claims priority from Swedish Patent Application No. 0302711-7, filed Oct. 13, 2003, and the benefit of U.S. Provisional Application No. 60/516,314, filed Nov. 3, 2003, the contents of which are hereby incorporated by reference in their entirety.

BACKGROUND

Electrical equipment from various fields of application, e.g. mobile telephones, personal digital assistants (PDA), and industrial control equipment often use a display device of some sort for providing the operator of the device with information. In simpler applications the display device is a one-way communication link, i.e. the display is used for providing information to the operator but not to receive information the other way back. In order to achieve interaction with the operator, push buttons or keyboards are normally used. If the electrical equipment is small sized, for example as with a PDA, normally no room is left on the device for a keyboard, wherein the manufacturer of the PDA must provide other means for enabling input of data into the device.

As is well known in the art the input means may be in form of a touch sensitive display making it possible to enter data without the need for a separate keyboard. Many different techniques for providing touch sensitive devices have been presented and the most common solution today is to use a separate transparent touch sensitive layer which is placed on top of the display. The touch sensitive layer is normally in form of two flexible superimposed plastic sheets that are separated by a small distance by means of insulating spacers. On the surfaces of the sheets facing towards each other, a matrix-like pattern of electrical conductors are arranged which pattern establishes an electric contact between the sheets at the location where the touch sensitive layer is depressed. A control unit scanning the matrix-like pattern on the plastic sheets may then detect the electric contact between the sheets and determine the coordinates for the depression on the display.

Even though the separate touch sensitive layer makes it possible to enter data into the device without the need for a keyboard, it is not an efficient way of realising a touch sensitive display since the transparency of the touch sensitive layer is not absolute hence making it difficult to view the information presented on the display under certain circumstances. The unsatisfactory transparency of the touch sensitive layer is even more noticeable when the display device is provided with back lighter or front lighter technology for making it possible to view the information on the display under poor lit conditions.

Another approach for providing a touch sensitive display is to provide a display with a sensor arranged under the display rather than on top of the display. The sensor then has to detect a touch on the display not by means detecting an electric contact between conductors as with the solution disclosed above, but by using capacitive or reflective properties of the display. In the former case, a capacitive coupling through the display to the finger touching the display makes it possible to detect a touch on the display as well as determine the position of the touch. In the latter case light or sound utilizing changes in the reflective properties of the display at the point of contact may be used for detecting a touch on the surface of the display.

Attempts have been made to provide touch sensitivity for displays without the use of separate sensors arranged on top or below the display surface. An approach is to use the display electrodes forming the pixels or the segments of the characters on the display for sensing the touch.

U.S. Pat. No. 5,043,710 discloses a touch sensor comprising a liquid crystal display (LCD), wherein a touch on the display is sensed by detecting changes in the dielectric properties of the display. A mechanical force applied to the LCD perpendicular to a flexible glass substrate over one of the display electrodes gives rise to a temporary disorganisation of the molecules in the liquid crystal thereby changing the dielectric constant of the liquid crystal under the display electrode. Each display electrode of the LCD is connected to an integrator, wherein a change of the dielectric constant of the liquid crystal when the segments of the LCD are in an excited state gives rise to an electric pulse indicating a touch on the LCD. However, the solution according to U.S. Pat. No. 5,043,710 becomes complex due to the large amount of integrators needed for sensing a touch. Moreover, for sensing a touch the front glass plate needs to be flexible making the display less durable. In addition to this, the working life of the display is also decreased due to the repeated compressions of the liquid crystal in the display.

U.S. Pat. No. 4,224,615 discloses a LCD with a flexible front plate, which LCD may be used as a device for receiving data from a human operator. An operator of a device comprising the touch sensitive display touches the flexible front plate of the display, wherein the front plate deflects towards the back substrate thereby increasing the capacitance between the display electrodes residing in the area being depressed. The capacitance measured between the front and back display segment is compared with the capacitance of a reference cell, wherein it is possible to detect a touch even if the affected display segments are actuated, i.e. presenting a shape on the display. As with U.S. Pat. No. 5,043,710 the invention according to U.S. Pat. No. 4,224,615 uses the change in dielectric constant of the liquid crystal being compressed for sensing a touch. The same problems with robustness and life expectancy as with the invention according to U.S. Pat. No. 5,043,710 exist in the solution according to U.S. Pat. No. 4,224,615.

US 2001/0020578 discloses a LCD with touch sensitivity, wherein the sensor arrangement is placed below a surface of the display. The sensors are preferably placed below the display in the regions of the display where no display segments are arranged. Alternatively, the display segments of the display may be used as sensors provided that the front and back segment are short-circuited. When the display electrodes act as touch sensors, no information may be presented on the screen due to the short-circuiting of the display electrodes. A microprocessor is therefore coupled to the display segments for alternating between presentation of information on the display and touch sensitivity.

U.S. Pat. No. 4,910,504 discloses a touch controlled display device, wherein a touch on the display is sensed by measuring the capacitance between different display electrodes on the front substrate. The font substrate may then be rigid protecting the display from deformation. The detector measuring the capacitance between the electrodes is coupled to the feeding pins of the display. A common counter-electrode is arranged on the back substrate in a manner known per se. As will be disclosed below, the counter-electrode will act as a short-circuit between the electrodes on the front substrate thereby deteriorating the accuracy of the touch sensitive display in regard of where on the screen the touch is made. Moreover, numerous stray-capacitances in the needed drive circuitry for the display will interfere with the capacitance measuring circuitry making it hard to determine where and if a touch is made.

DE 19802479 discloses a touch-sensitive display for use in e.g. elevators. The front surface of display element is provided with an electrically conducting layer which is so thin that the display element is visible through the conducting layer. An evaluation circuit is connected to the conducting layer in order to detect a touch on the display. However, by arranging a conductive layer in front of the display element, the visibility of the display element is deteriorated. Moreover, the conductive layer will be exposed to wear from users of the display, which implies that the endurance of the display will be insufficient for many applications.

For manufacturers of display driver circuits it is of most importance that the circuitry used for detecting a touch on the screen is not affecting the behaviour or the life-expectancy of the driver circuitry. Hence a touch sensitive display which behaves like a "normal" display from a drivers point of view is hence wished for.

SUMMARY OF THE INVENTION

An object of the present invention is to overcome the above described problems of the known technologies in regards to providing a touch sensor which is durable and provides a reliable detection of touch on the display. The present invention is based on the understanding that a display is associated with specific physical characteristics which influence the reliability of the detection of a touch on the display.

Particular advantages of the present invention are reliability of the detection of a touch on the screen, improved robustness of the touch sensor, and the improved matching towards available display driver circuits.

A particular feature of the present invention relates to the provision of a touch sensor with a basic configuration making it possible to reliably detect a touch on the display without deforming the display or requiring specially adapted display driver circuitry. The designer of a system comprising a touch sensor according to the present invention may then freely choose driver circuits thereby lowering the overall cost of the system.

The above objects, advantages and features together with numerous other objects, advantages and features, which will become evident from the detailed description below, are obtained according to a first aspect of the present invention by a touch sensor comprising:

a display device having a substrate on which substrate at least one display electrode is disposed for the display of a shape on the display device;

an interface coupled to the at least one display electrode for receiving display data to the display device;

a measuring circuit coupled to the at least one display electrode;

switching means for connecting the interface to the at least one display electrode when the switching means is in a first state of operation and connecting the measuring circuit to the at least one display electrode when the switching means is in a second state of operation.

A touch sensor according to the present invention will hence be able to reliably detect a touch on the display by means of a capacitance measuring circuit even though large stray capacitances are present in the display.

A touch sensor according to the present invention may comprise a measuring circuit which is a capacitance measuring circuit.

A touch sensor according to the present invention may comprise a measuring circuit which is a resistance measuring circuit.

According to the present invention the measuring circuit may comprise a signal generator coupled to the at least one of the display electrodes for providing a predetermined test signal to the display electrode, and a signal evaluating circuit coupled to the at least one display electrode for receiving the test signal from the signal generator.

According to the present invention the signal evaluation circuitry may be adapted to detect a deviation in the test signal when the switching means is in the second state of operation.

According to the present invention the signal generator may be adapted to apply the test signal to the segments on a back substrate or to the segments on a front substrate of the display device.

According to the present invention the segments on the substrate which is not connected to the signal generator may be left in a high-ohmic state.

The present invention also relates to a method for detecting a touch on a display having a substrate, on which substrate at least one display electrode is disposed for the display of a shape on the display device, wherein said display electrode is coupled to an interface for receiving display data to the display device, the method comprising the steps of:

disconnecting the at least one display electrode from the interface;

connecting said display electrode to a measuring circuit; and detecting a change in an electrical property of the display electrode due to an electrical coupling towards an object touching the display device in the vicinity of the display electrode.

The method according to the present invention may comprise the steps of applying a predetermined test signal to the display electrode and detecting a deviation in the test signal due to an electrical coupling towards an object touching the display device in the vicinity of the display electrode.

The method according to the present invention may detect a capacitive coupling towards an object touching the display device in the vicinity of the display electrode.

The method according to the present invention may detect a galvanic coupling towards an object touching the display device in the vicinity of the display electrode.

BRIEF DESCRIPTION OF THE DRAWINGS

Further objects, features and advantages of the present invention will become apparent upon consideration of the following detailed description in conjunction with the appended drawings.

DETAILED DESCRIPTION OF THE INVENTION

The most common display used today is the liquid crystal display (LCD) whose design and operation is well-known to the skilled person. Variants of the LCD display, e.g. Thin Film Transistor Displays (TFT) as well as other display techniques, such as Plasma Display Panels (PDP), Vacuum Fluorescent Displays (VFD), Ferroelectric Liquid Crystal displays (FLC), Surface-stabilized cholesteric texture-type (SSCT) displays, organic Light-Emitting Diode (OLED) displays, and Liquid Crystal on Silicon (LCOS) displays are commonly used depending on the specific field of application. For the sake of simplicity the following text will disclose a touch sensitive display in form of a LCD, wherein a change in capacitance in the display is detected. The present invention is, however, not limited to such a display, but may be implemented on a display of any kind comprising at least one substrate on which at least one display electrode is arranged which may be capacitively, galvanically or inductively coupled to an external object.

Figure 1A:
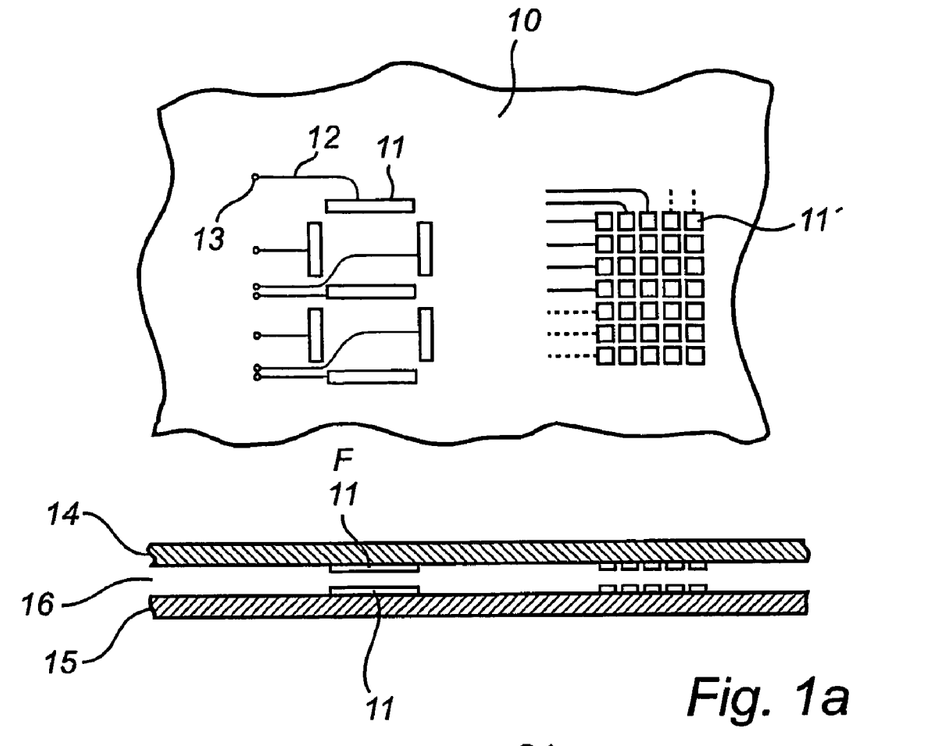
FIG. 1a illustrates the structure of a display known per se.

FIG. 1a illustrates a top and side view of a portion of a display 10 known per se. The leftmost figure in FIG. 1a illustrates the well known seven segment 11 arrangement, wherein different digits may be presented depending on which segments 11 that are active. Each segment 11 is reachable by means of thin wires 12 extending from the segment 11 towards electrical terminals 13 normally provided on the edge of the display 10. The segments 11 are formed on the inside of a front substrate 14 and a back substrate 15 of the display 10. In this context it is emphasized that the substrates used in the display may be made of glass or plastic, on which a suitable electrical material, such as Indium Tin Oxide (ITO), is deposited as to form the segments 11, or one or more substrates in the display may be made of an electric material, such as aluminium and shaped as to provide the segments 11. In e.g. OLED displays a rib structure is pre-formed on patterned ITO anode lines on a glass substrate. Organic materials and cathode metal are deposited on the substrate, wherein the rib structure automatically produces an OLED display with electrical isolation for metallic cathode lines formed on top of the deposited organic materials. Depending on the display technique used the display may comprise further elements besides the front substrate 14 and the back substrate 15, which elements are not shown for sake of clarity. For example the display may also comprise a first polarizer arranged on top of the front substrate 14 and a second polarizer arranged below the back substrate 15. In addition to the polarizers, the space between the front substrate 14 and the back substrate 15 may be filled with liquid crystals 16 in a manner known per se.

The rightmost figure in FIG. 1a illustrates an alternative design of the display electrodes 11 on the display 10. Instead of the seven segment 11 arrangement the display electrodes 11 are arranged as a matrix of pixels 11'. At the cost of more wires 12 and terminals 13, this arrangement facilitates the presentation of more complex figures than the seven segment 11 arrangement. The display functionality of the matrix arrangement of pixels is, however, the same as with the seven segment 11 arrangement. In this context it is appreciated that the term segment is used for describing a display electrode on a substrate or in a metallic layer in a display. The term shall not be interpreted as only describing a display electrode in a seven-segment arrangement, but may be an electrode of any shape, e.g. a pixel in a matrix arrangement as disclosed above.

The segments 11 on the back substrate 15 are normally interconnected so as to minimize the amount of wires 12 and terminals 13 on the display, i.e. the segments 11 on the back substrate 15 will always have the same potential, whereas shapes on the display 10 are presented by means of changing the potential of the segments 11 on the front substrate 14 in relation to the potential on the segments 11 on the back substrate 15.

Figure 1B:
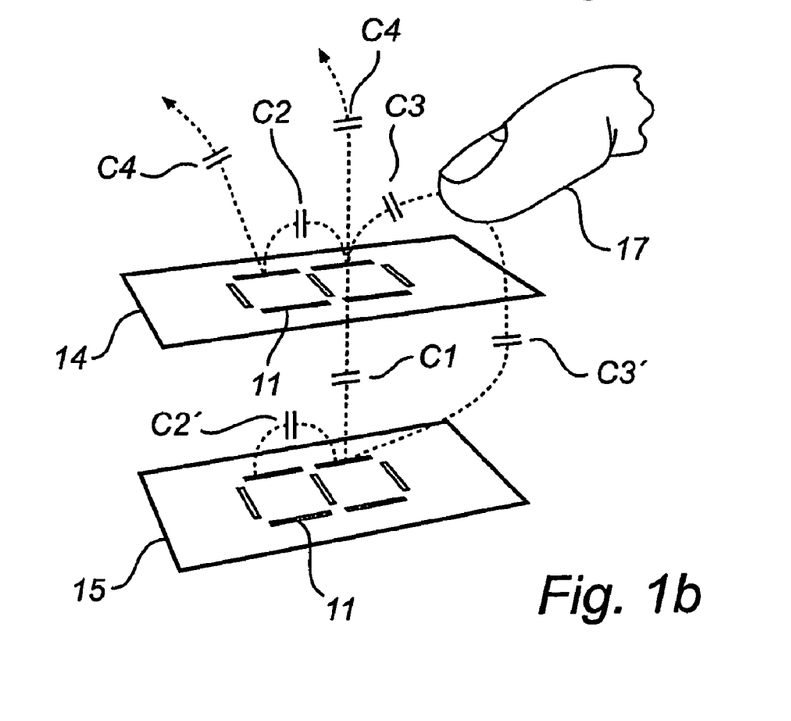
FIG. 1b illustrates the disposition of some of the stray capacitances associated with a display known per se.

FIG. 1b is a simplified view of the allocation of some of the stray-capacitances in an LCD display 10. The spacing of the substrates 14, 15 in the figure is exaggerated for the sake of clarity. As can be seen in the figure a first capacitance C1 stretches from the segments 11 on the front substrate 14 towards the segments 11 on the back substrate 15. The major contribution to C1 is the capacitance between the segments 11 on front and back substrates that are on top of each other. It is, however, appreciated that the capacitance C1 also includes the stray capacitances between each segment 11 on the front substrate 14 and all segments 11 on the back substrate 15.

A second capacitance C2, C2' appears between different segments 11 on each substrate 14, 15. The major contribution to C2 is the capacitance between adjacent segments, but it is understood that C2 also includes the capacitance between one specific segment 11 and all other segments 11 on the same substrate 14, 15.

When a user of the touch sensor touches the display a third capacitance C3, C3' appears between the segments 11 on the front 14 and back substrate 15 and the finger 17 of the user. The value of the third capacitance C3, C3' depends inter alia on the thickness of the substrates and the properties of the object touching the display 10.

A fourth capacitance C4 stretches from each and every segment towards ground potential via the environment and depends on the distance to the closest ground reference as well as on the properties of the environment (i.e. the dielectric constant of the air in the environment, the relative humidity, etc.).

As to the size of the different stray capacitances the value of C1 is by far greater than C2 and C3 due to the close spacing between the front substrate 14 and the back substrate 15. For the same reason the sizes of C3 and C3' are almost equal whereas the value of C2 depends on the size display 10 as well as on the spacing of the segments 11. In case the segments 11 on the back substrate 15 are interconnected, the stray capacitance C2' becomes negligible compared to the galvanic contact provided by the thin interconnecting wires 12 on the substrate 15. An increase in the capacitance C2 due to a touch on the display covering two adjacent segments will hence be hard to detect due to the relatively large capacitance C1 and the short-circuited segments on the back substrate.

Figure 2:
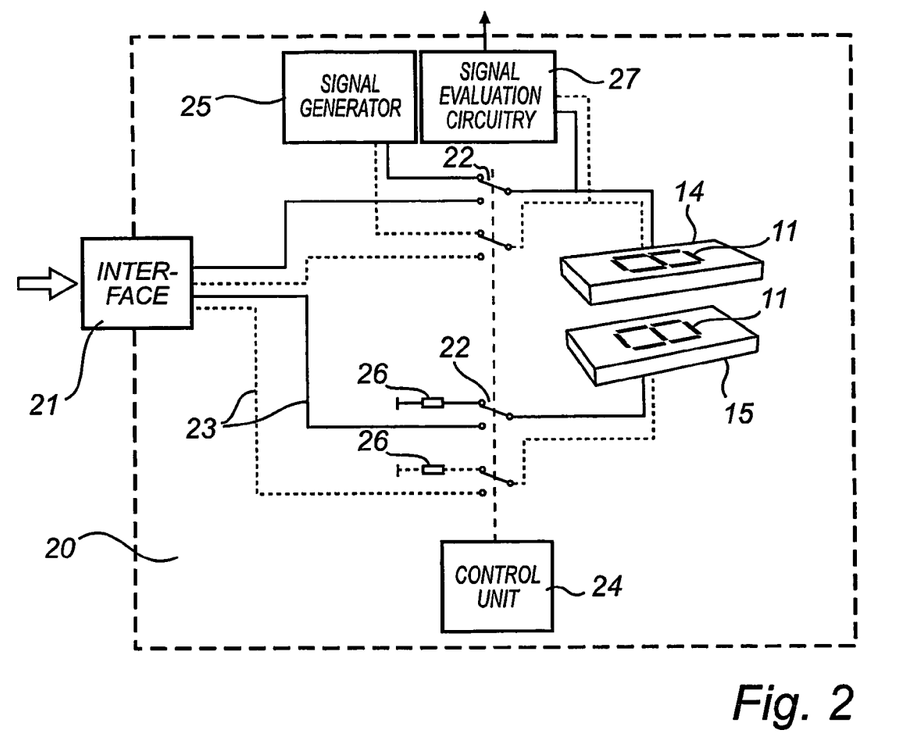
FIG. 2 is a schematic diagram of a touch sensor according to a preferred embodiment of the present invention.

FIG. 2 illustrates a first embodiment of a touch sensor 20 according to the present invention. An interface 21 is coupled to the display driver circuitry (not shown). It is emphasized that the display driver circuitry is not especially adapted for the touch display according to the present invention, but may on the contrary be manufactured for driving ordinary displays without touch sensitivity. The interface may in its simplest form be a contact providing the display driver circuitry with electric connections to the display electrodes 11 on the display 10. Alternatively the interface comprises buffers and impedance matching means for providing the display driver circuitry with an optimum operating point thereby increasing the working time of the display driver.

The interface 21 is coupled to a set of switches 22 which in a first state of operation connects the interface 21 to the display electrodes 11 on the front substrate 14 and the back substrate 15 of the display 10. In FIG. 2 only the switches 22 associated with one pair of segments 11 are illustrated for the sake of clarity; however, the dashed lines in the figure indicates that each segment 11 or group of segments 11 in case the segments 11 on the back substrate 15 are interconnected (partially or completely) on the front substrate 14 and the back substrate 15 are connected to the interface 21 by means of a switch 22. In a preferred embodiment of the present invention, the segments 11 on the back substrate are not interconnected but are individually reachable within the touch sensitive device 20. The interface 21 groups the wires 23 from the segments 11 on the back substrate 15 making it possible to use standard display driver circuitry adapted for driving displays with a common electrode on the back substrate 15. As will be disclosed below the accuracy of the touch sensor is improved by not interconnecting the wires 23 from the segments 11 on the back plane 15 until they reach the interface 21, thereby making it possible to isolate each segment 11 by means of the switches 22. By not interconnecting the segments 11 on the back segment 15 it is also possible to detect two or more touches on the display 10 simultaneously, i.e. it is possible to distinguish a touch by a finger from an unintentional touch by the whole hand normally referred to as "palm rejection".

When the switches 22 are in the first state of operation the display 10 is not sensitive to touches on the surface thereof, but acts as an ordinary display. However, a control unit 24 in the touch sensor 20 operates the switches 21 in the device so as to put them in a second state of operation, wherein the display 10 is disconnected from the interface 21. Instead the segments 11 on one of the substrates are connected to a signal generator 25 which feeds a test signal to the segments 11. In the figure the segments 11 on the front substrate 14 are connected to the signal generator 25, but in an alternative embodiment the segments 11 on the back substrate 15 rather than the segments 11 on the front substrate 14 may be connected to the signal generator 25. As disclosed above, the relatively large capacitance C1 makes it equally possible to connect either the segments 11 on the front substrate 14 or the segments 11 on the back substrate 15 to the signal generator 25 without loosing functionality of the touch sensitive device.

As the segments 11 on the front substrate 14 are connected to the signal generator 25, the segments 11 on the back substrate 15 are left in a high-impedance state either by simply disconnecting them from the interface 21 or, as shown in FIG. 2, connect them to signal ground via a high-ohmic resistor 26. As disclosed above, the information on the display 10 depends on the difference in potential between the segments 11 on the front substrate 14 and the segments 11 on the back substrate 15. The high-ohmic state of the segments 11 on the back substrate 15 and the relatively large capacitance C1 will ensure that any difference in potential between different segments 11 on the substrates 14, 15 is preserved even though a test signal is applied to the segments 11 on one of the substrates 14, 15. A change in potential on a segment on the front substrate 14 will hence change the potential on the segment 11 arranged directly below on the back substrate 15. Consequently, the information presented on the display when the switches 22 are in the first state of operation will be preserved when the switches 22 connects the signal generator 25 to the segments 11 on the front substrate 14 in the second state of operation.

A signal evaluation circuit 27 is coupled to the segments 11 on the front substrate 14. Since the capacitances C1 and C2 of the display are well known and are established when the display is manufactured, the response to the test signal by the display when no foreign object touches the display is also well known. When the operator of the device puts his finger on the display, the capacitance C3 disclosed above will become part of the load presented to the signal generator. The response to the test signal will hence be changed indicating to the signal evaluation circuitry 27 the presence of a touch on one or more of the segments 11 on the display 10. Since all segments 11 on the front substrate 14 are connected to the signal evaluation circuitry 27 it may determine which segment 11 or segments 11 that are affected by the touch. The signal evaluation circuitry may then respond to the touch by either providing a general "key-down"-signal or preferably more detailed information regarding which specific segments 11 that are affected by the touch to an external control unit (not shown).

Figure 3:
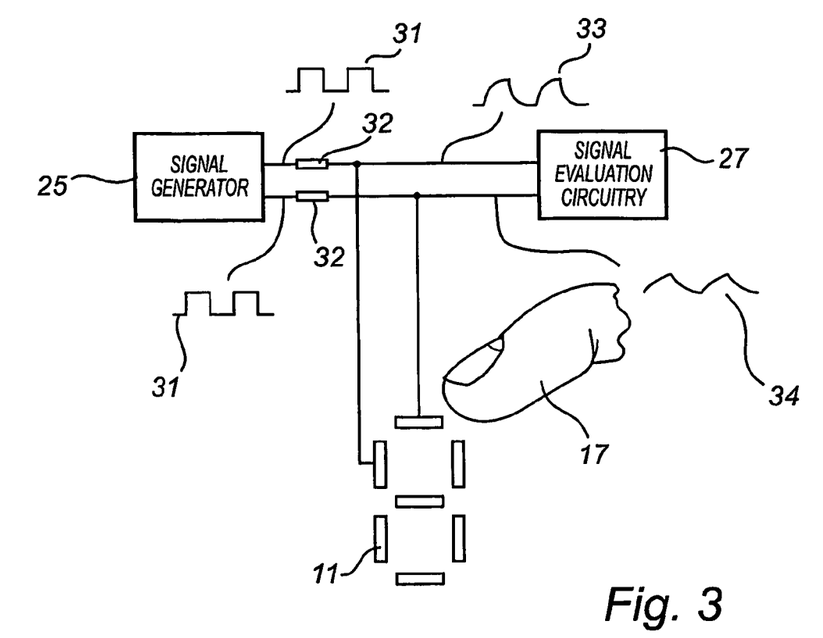
FIG. 3 is a more detailed illustration of the function of the touch sensor according to a first embodiment of the present invention.

FIG. 3 illustrates the function of the signal generator 25 and the signal evaluation circuitry 27 according to a first embodiment of the present invention. When the switches are in the second state of operation, the signal generator 25 feeds a square wave 31 to the segments 11 on the front substrate 14 via a set of resistors 32. In the figure only two resistors 32 are shown for the sake of clarity. The actual number of resistors 32 depends on the number of segments 11 that are to be used for detecting a touch on the display. Since the segments 11 on the back substrate 15 are disconnected and left in a high-ohmic state the load presented by the segments 11 alone will become the capacitances C1 and C2 in series with the small capacitance C4 in FIG. 1b. Hence by leaving the segments 11 on the back plane 15 in a high-ohmic state the large capacitor C1 will become series-coupled with the small capacitance C4 making the contribution of C1 less dominant. In case the electrodes 11 on the back substrate 15 are interconnected the accuracy of the touch sensor will be somewhat deteriorated due to the capacity-coupling between different segments 11 on the front substrate 14 via the short-circuited back segments 11 and the capacitances C1 between each front and back segment 11. The small capacitance presented by the coupling of C1, C2 and C4 will slightly change the appearance of the test signal 33 at a point to the right of the resistors in FIG. 3. Instead of a square wave, the test signal exhibits the well know exponential increase in potential due to the charging of capacitances C1, C2, and C4 via the fixed resistors 32. Preferably the rise or fall time of the loaded test signals are measured by the signal evaluation circuitry 27 so as to determine if the capacitive load has changed. Small variations in the rise time may occur due to changes in the environment in which the touch sensor 20 is operating. These small changes will not give rise to an output signal from the signal evaluation circuitry 27 indicating a touch on the display 10, but are accepted as environment-induced variations in the test signal.

When the operator 17 of the device 20 touches the display 10, the capacitive load presented to the signal generator 25 will increase due to the capacitance C3 hence increasing the rise and fall time of the test signal 34 to the right of the resistors 32. The capacitance C3 is large compared to the series connection C1, C2, and C4 thereby making a great contribution to the overall capacitance presented to the signal generator. The exact magnitude of the increase in the rise time is not critical as long as it is large enough for making it possible to distinguish a touch on the display from the small environment-induced variations disclosed above. The signal evaluation circuitry may be in form of a simple comparator providing an output signal in case the rise time exceeds a predetermined value, or may be intelligent in that it analyses the long time behaviour of the rise time and compensates for changes in the environment.

The control unit 24 is adapted to alternate the switches 22 between the first and second state of operation. The rate at which the control unit 24 change the state of the switches 22 depends on the capacitance C1, the resistance between each segment and signal ground, and the inertia in the liquid crystal, i.e. how long it takes for the crystals in the display to turn in the absence of an external electric field.

Figure 4:
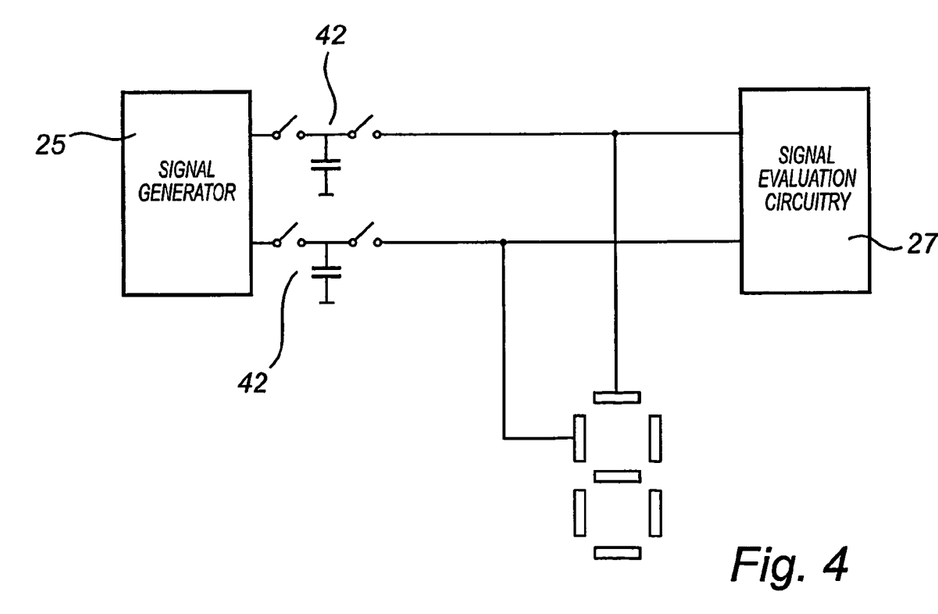
FIG. 4 is a more detailed illustration of the function of the touch sensor according to a second embodiment of the present invention.

The resistances 32 in FIG. 3 may be implemented in form of traditional resistors 32 or as shown in an alternative embodiment in FIG. 4 as switched capacitors 42. The switched capacitor 42 known per se is well suited for integration on a chip making it possible to combine the electronics of the touch sensor with the display 10 as an integral unit.

In the above embodiment of the present invention a capacitance measuring circuit in form of a signal generator 25 and a signal evaluation circuit 27 is disclosed, wherein the signal evaluation circuit 27 measures the rise or fall time of the test signal. It is however appreciated that the capacitance measuring circuit as well may measure the current fed to the display at a fixed or varied voltage and frequency, measure the phase difference between current and voltage applied to the display, or measure the capacitance between at least one segment 11 of the display 10 and the environment in any other suitable way.

In an alternative embodiment of the present invention the display electrode 11 may be arranged on a substrate 14, 15 so as to make it possible to detect a galvanic contact between the display electrode 11 and an object touching the display device 10. For example, a display may be formed by a matrix of light emitting diodes (LED), wherein each diode of the display is soldered to a pair of pads on a printed circuit board (PCB). Each pad then constitutes a display electrode 11 which may be disconnected from the display driver circuitry and used for detecting a touch on the display device 10. Hence, if a person touches the display electrode 11, the person will act as a capacitor receiving charge from the display electrodes 11. A small, detectable current will flow from the display device 10 through the finger of the person indicating a touch on the display device 10.

In yet an alternative embodiment of the present invention the display electrode 11 may be provided with a high-voltage when the switches are in the second state of operation. The display electrodes 11 on the substrates 14, 15 may then be arranged between the substrates 14, 15, as disclosed with regards to the LCD display above, wherein a very large resistance of the substrate still may allow the flow of a current large enough to be detected when a person touches the front of the display device 10.

In yet an alternative embodiment of the invention, touch sensitive areas are formed on one side of a third substrate in accordance with the description in relation to FIG. 1 (i.e. a substrate e.g. made of glass or plastic, on which a suitable electrical material, such as Indium Tin Oxide (ITO), is deposited as to form the desired touch-sensitive areas). The third substrate may then be arranged in front of any kind of display in order to provide touch-sensitivity for the display. The touch-sensitive areas are preferably arranged on the inside of the substrate, i.e. the side which is facing the display and is not in direct contact with the users of the touch-sensitive substrate, in order to provide a long operational life of the touch-sensitive substrate even under exposure to hard wear. The third substrate will, in addition to provide touch sensitivity for the display, also act as a protective cover since it is arranged in front of the display.

The invention claimed is:

1. A touch sensor, comprising:
   a display device having a first substrate on which at least one display electrode is disposed, and a second substrate on which at least one display electrode is disposed, for the display of a shape on the display device;
   an interface coupled to the at least one display electrode on the first substrate for receiving display data to the display device, the display data providing a voltage value between the at least one display electrode on the first substrate and the at least one display electrode on the second substrate;
   a measuring circuit coupled to the at least one display electrode on the first substrate; and
   switching means for connecting the interface to the at least one display electrodes on the first and second substrates when the switching means is in a first state of operation and for connecting the measuring circuit to the at least one display electrode on the first substrate when the switching means is in a second state of operation, wherein:
   the measuring circuit is configured to detect a change in capacitance or resistance measured at the at least one display electrode on the first substrate; and
   the switching means is configured to preserve the voltage value between the at least one display electrode on the first substrate and the at least one display electrode on the second substrate when the switching means is in the second state of operation.

2. A touch sensor according to claim 1, wherein the measuring circuit comprises:
   a signal generator coupled to the at least one display electrode for providing a predetermined test signal to the display electrode; and
   a signal evaluating circuit coupled to the at least one display electrode for receiving the test signal from the signal generator.

3. A touch sensor according to claim 2, wherein the signal evaluation circuit is configured to detect a deviation in the test signal when the switching means is in the second state of operation.

4. A touch sensor according to claim 2, wherein:
   the display device comprises a front substrate having a plurality of segments; and
   the signal generator is configured to apply the test signal to the segments on the front substrate.

5. A touch sensor according to claim 2, wherein:
   the display device comprises a back substrate having a plurality of segments; and
   the signal generator is configured to apply the test signal to segments on the back substrate.

6. A touch sensor according to claim 4, wherein the segments on the front substrate which are not connected to the signal generator are retained in a high-ohmic state.

7. A method for detecting a touch on a display device, said display device having a first substrate on which at least one display electrode is disposed and a second substrate on which at least one display electrode is disposed, for the display of a shape on the display device, wherein said display electrodes are coupled to an interface for receiving display data to the display device, comprising the steps of:
   disconnecting the at least one display electrode on the first and second substrate from the interface;
   connecting said display electrode on the first substrate to a measuring circuit; and
   detecting, by the measuring circuit, a change in a capacitance or resistance of the at least one display electrode on the first substrate due to an electrical coupling with an object touching the display device in the vicinity of the display electrode on the first substrate, wherein
   the at least one display electrode on the second substrate is connected such that a voltage level between the at least one display electrode on the first substrate and the at least one display electrode on the second substrate is preserved.

8. A method according to claim 7, wherein detecting a change in a capacitance or resistance of the display electrode comprises:
   applying a predetermined test signal to the display electrode and
   detecting a deviation in the test signal due to an electrical coupling with an object touching the display device in the vicinity of the display electrode.

9. A method according to claim 7, wherein the electrical coupling comprises a capacitive coupling.

10. A method according to claim 7, wherein the electrical coupling comprises a galvanic coupling.

11. A method according to claim 8, wherein the electrical coupling comprises a capacitive coupling.

12. A method according to claim 8, wherein the electrical coupling comprises a galvanic coupling.

13. A touch sensor according to claim 3, wherein:
   the display device comprises a front substrate having a plurality of segments; and
   the signal generator is adapted to apply the test signal to the segments on the front substrate.

14. A touch sensor according to claim 3, wherein:
   the display device comprises a back substrate having a plurality of segments; and
   the signal generator is adapted to apply the test signal to the segments on the back substrate.

15. A touch sensor according to claim 5, wherein the segments on the back substrate which are not connected to the signal generator are retained in a high-ohmic state.

* * * * *

UNITED STATES PATENT AND TRADEMARK OFFICE
CERTIFICATE OF CORRECTION

PATENT NO. : 7,705,834 B2
APPLICATION NO. : 10/575622
DATED : April 27, 2010
INVENTOR(S) : Anders Swedin It is certified that error appears in the above-identified patent and that said Letters Patent is hereby corrected as shown below:

On the Title page, Item (73), in the Assignee line, line 1, change "Intergritouch" to --Integritouch--.

Signed and Sealed this
First Day of March, 2011

David J. Kappos
*Director of the United States Patent and Trademark Office*